No. 819,476. PATENTED MAY 1, 1906.
J. VICARS, THE ELDER, T. VICARS & J. VICARS, THE YOUNGER.
MECHANICAL STOKING APPLIANCE.
APPLICATION FILED NOV. 26, 1902.

2 SHEETS—SHEET 2.

UNITED STATES PATENT OFFICE.

JOHN VICARS, THE ELDER, THOMAS VICARS, AND JOHN VICARS, THE YOUNGER, OF EARLESTOWN, ENGLAND.

MECHANICAL STOKING APPLIANCE.

No. 819,476.     Specification of Letters Patent.     Patented May 1, 1906.

Application filed November 26, 1902. Serial No. 132,928.

*To all whom it may concern:*

Be it known that we, JOHN VICARS, the Elder, THOMAS VICARS, and JOHN VICARS, the Younger, subjects of the King of Great Britain, residing at Earlestown, in the county of Lancaster, England, have invented new and useful Improvements in Mechanical Stoking Appliances, of which the following is a specification.

This invention relates more especially to mechanical stoking appliances and furnaces in which reciprocating fire-bars and forced draft are used, although it may be applied in part to similar furnaces using natural draft; and the objects are to provide appliances whereby the fire-bar-reciprocating mechanism may when forced draft is used be protected from the heat and also whereby the sets of alternate bars may be readily removed and replaced without disturbance of the fire-bar-reciprocating mechanism. We attain these objects by mechanism and arrangements such as are illustrated in the accompanying drawings, in which—

Figure 1:
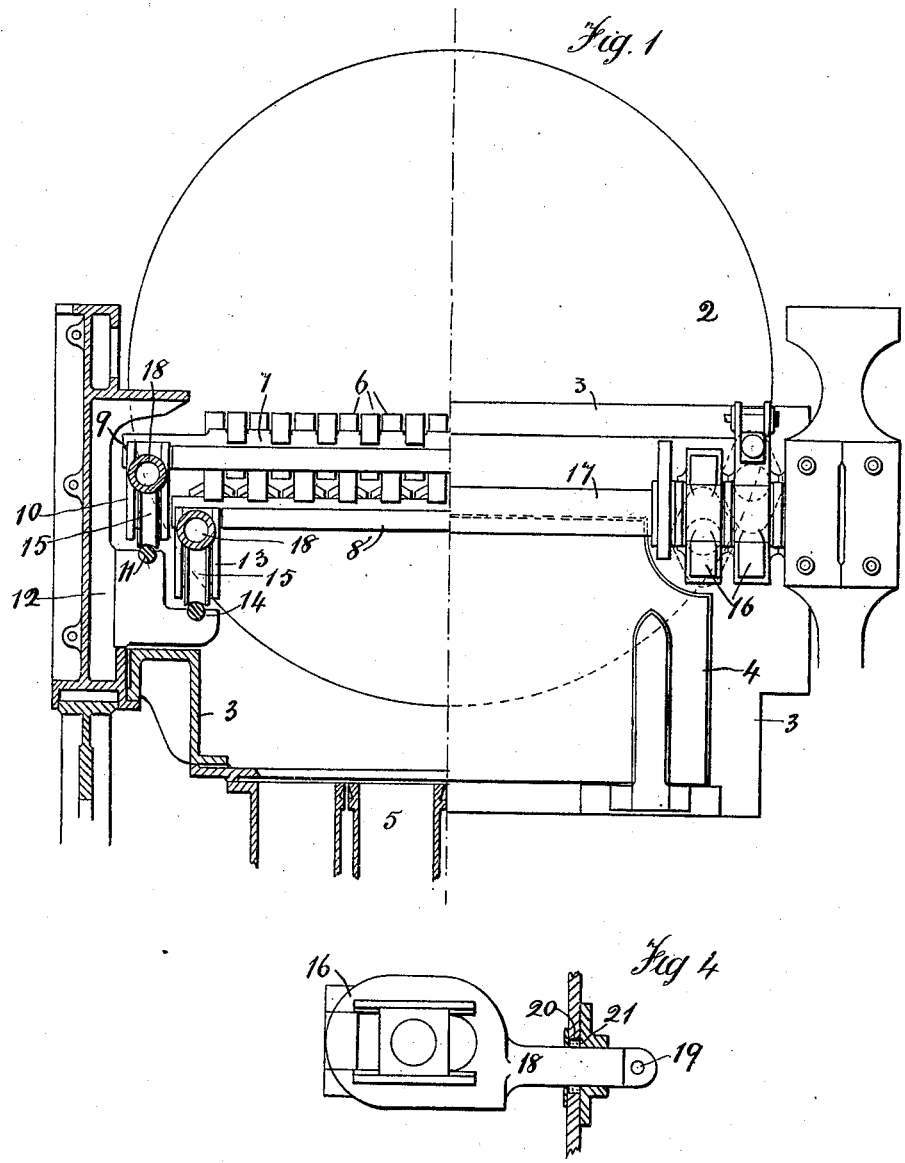
Figure 2:
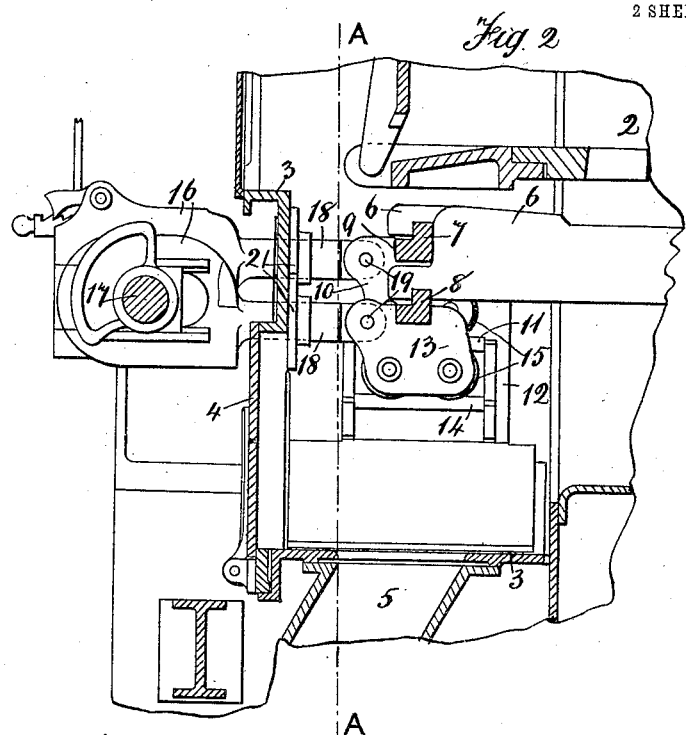
Figure 3:
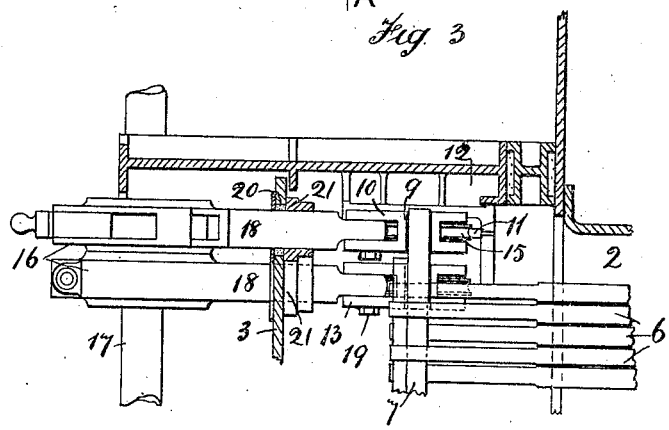

Figure 1 is a front view half in elevation and half in vertical section on the line A A on Fig. 2. Fig. 2 is a central longitudinal section, and Fig. 3 is a plan of so much of an internal-flue boiler-furnace with closed-in ash-pit and stoker mechanism as is necessary to clearly show our invention. Fig. 4 is a detail view, partly in section, of a reciprocating yoke or key and stuffing-box.

2 is the furnace.

3 is a casing provided with a door 4 for closing in the ash-pit.

5 represents inlets for air under pressure.

6 represents fire-bars, the ends of alternate bars resting on transverse supporting-bars 7 8, as usual. The ends of the bar 7 fit into recesses 9 or over projections or the like in or on carriages 10, one at each side of the furnace, resting on rails 11, connected to the framework 12. The bar 8 is similarly connected to the carriages 13, resting on rails 14. The carriages may rest directly on the rails, so that they can slide thereon; but we prefer to fit the carriages with wheels 15 to diminish friction. 16 represents the usual yokes or keys carrying teeth or projections against which studs on a rotating shaft 17 bear, so as to reciprocate the yokes to and fro. These parts may be constructed and operated in any well-known way.

18 represents extension-pieces, preferably circular in cross-section and formed with or attached to the yokes 16 and connected to the carriages 10 and 13 by pins 19 or other securing devices. The yoke extensions 18 pass through openings 20 in the casing and are provided with stuffing-boxes or packing-rings 21 to prevent air escaping from the casing at the openings. (See Fig 4.) The ends of the extensions 18 where jointed to the carriages are preferably of somewhat less dimensions in cross-section than the other parts of the extensions, so that they may be easily inserted from the outside through the packing-rings and openings in the casing.

By the above arrangements when it is desired to remove the fire-bars the transverse bars 7 8 may be readily lifted out of the recesses in the carriages without disturbing the reciprocating mechanism, which latter also by taking out pins 19 may be removed and replaced without disturbing the casing or fire-bars. Also the reciprocating mechanism is open to the air and is protected by the casing from the heat of the furnace.

Our invention is not confined to forced-draft furnaces, as it will be obvious the arrangements of bars 7 and 8 and carriages 10 and 13 may be applied also to furnaces with open ash-pits and natural draft.

What we claim is—

1. In a mechanical stoking appliance, the combination with the fire-bars of a furnace, of a fire-bar support engaging the outer ends thereof, movable carriages removably connected to the ends of the fire-bar support, and reciprocating mechanism detachably secured to said carriages; substantially as described.

2. In combination in mechanical stoking appliances a casing inclosing the ash-pit of a furnace, a fire-bar support within the casing, a movable carriage connected to each end of the fire-bar support, detachable extension-bars passing through openings in the front of the casing approximately in line with the travel of the carriages and connected to each carriage by ends of less dimensions than the cross-section of the extension-bars, and mechanism external to the casing for reciprocating the extension-bars; substantially as described.

3. In combination in mechanical stoking appliances, a casing inclosing the ash-pit of the furnace, a fire-bar support within the casing, a movable carriage connected to each end of the fire-bar support, detachable extension-bars passing through openings in the front of the casing approximately in line with the travel of the carriages and connected to each carriage by ends of less dimensions than the cross-section of the extension-bars, packing devices round the extension-bars at the openings in the casing adapted to prevent escape of air, and mechanism external to the casing for reciprocating the extension-bars; substantially as described.

In testimony whereof I, the above-named John Vicars, the Elder, have signed my name to this specification in the presence of two subscribing witnesses.

JOHN VICARS, THE ELDER.

Witnesses:
GEORGE CECIL MUNRO,
ERNEST FREDERICK WHITE.

In testimony whereof we, the above-named Thomas Vicars and John Vicars, the Younger, have signed our names to this specification in the presence of two subscribing witnesses.

THOMAS VICARS.
JOHN VICARS, THE YOUNGER.

Witnesses:
W. B. JOHNSON,
F. BENNETT.